United States Patent [19]

Rutkowski

[11] E Re. 29,780

[45] Reissued Sep. 26, 1978

[54] MULTIPLE SOCKET ASSEMBLY FOR ELECTRICAL COMPONENTS

[75] Inventor: John L. Rutkowski, Mount Prospect, Ill.

[73] Assignee: Appleton Electric Company, Chicago, Ill.

[21] Appl. No.: 831,355

[22] Filed: Sep. 7, 1977

Related U.S. Patent Documents

Reissue of:

[64] Patent No.: 4,032,209
Issued: Jun. 28, 1977
Appl. No.: 649,477
Filed: Jan. 15, 1976

[51] Int. Cl.[2] ..... H01R 13/54

[52] U.S. Cl. ..... 339/91 R; 339/22 R

[58] Field of Search ..... 339/22 R, 22 B, 76, 339/75 R, 75 M, 91 R, 94 R, 94 M, 116 R, 116 C; 174/97, 101

[56] References Cited

U.S. PATENT DOCUMENTS

| | | | |
|---|---|---|---|
| 3,015,795 | 1/1962 | Meacham | 339/22 B X |
| 3,501,735 | 3/1970 | Ballman et al. | 339/75 M |
| 3,566,336 | 2/1971 | Johnson et al. | 339/91 R |
| 3,821,688 | 6/1974 | Larsile | 339/22 R |

*Primary Examiner*—Roy Lake
*Assistant Examiner*—E. F. Desmond
*Attorney, Agent, or Firm*—Darbo & Vandenburgh

[57] ABSTRACT

A track has spaced rails, each of which holds a plurality of clips, each clip being at a respective station. Thus, there are a pair of clips at each station. A multiple socket unit is mountable between the rails at each station or at adjacent stations. An electrical component, as for example a relay, can be plugged into each socket unit and when so plugged in is engaged by the clips which hold the component unit and the socket unit together and the combination of the two locked to the track at the station(s).

7 Claims, 3 Drawing Figures

MULTIPLE SOCKET ASSEMBLY FOR ELECTRICAL COMPONENTS

Matter enclosed in heavy brackets [ ] appears in the original patent but forms no part of this reissue specification; matter printed in italics indicates the additions made by reissue.

BACKGROUND AND SUMMARY OF THE INVENTION

For many electrical wiring requirements, it is desirable to use electrical components which are discrete units or modules. This is particularly advantageous for several reasons. For example, it facilitates the repair. Thus, it is possible to trouble-shoot a disabled assembly by test inserting new units one at a time for existing units until the defective unit is located. Secondly, as is thus readily apparent, the overall assembly need not be replaced when a defect exists only in one individual component thereof. Another advantage is the ability to tailor-make an assemblage of electrical components to fit a particular job. Thus, where there is only a few, or even one, of a particular assemblage to be produced, this can be done from a series of standard modules at a cost that is usually far less than it would be to otherwise fabricate the overall assembly. Furthermore, as improvements are made in the characteristics of one particular module, an improved module can readily be substituted for the original, unimproved version to thus up-date the overall assembly.

The foregoing advantages have been recognized and electrical components have been produced as unitary modules (e.g., radio tubes, plug-in relays, etc.). Tracks for holding wiring sockets are known (e.g., U.S. Air Force MIL-R-6106/3A; U.S. Air Force MIL-R-6106/5A; and U.S. Air Force MIL-R-6106/1).

The principal object of the present invention is to provide such an assembly having a number of advantages. One significant advantage is that the electrical component or module is securely held onto the socket unit and the two are locked to the rail against any possibility of accidental displacement. Not only are the two locked together, but a constant pressure is exerted to the end of forcing one against the other so that pressure is maintained on a sealing gasket between the two. Another advantage is that while the socket unit can be inserted and replaced at will at a station on the track, it is securely held by the track against accidental displacement, such as might result from the force applied when an electrical component or module is removed from that socket.

Further objects and advantages will become apparent from the appended disclosure.

DESCRIPTION OF SPECIFIC EMBODIMENT

Figure 1:
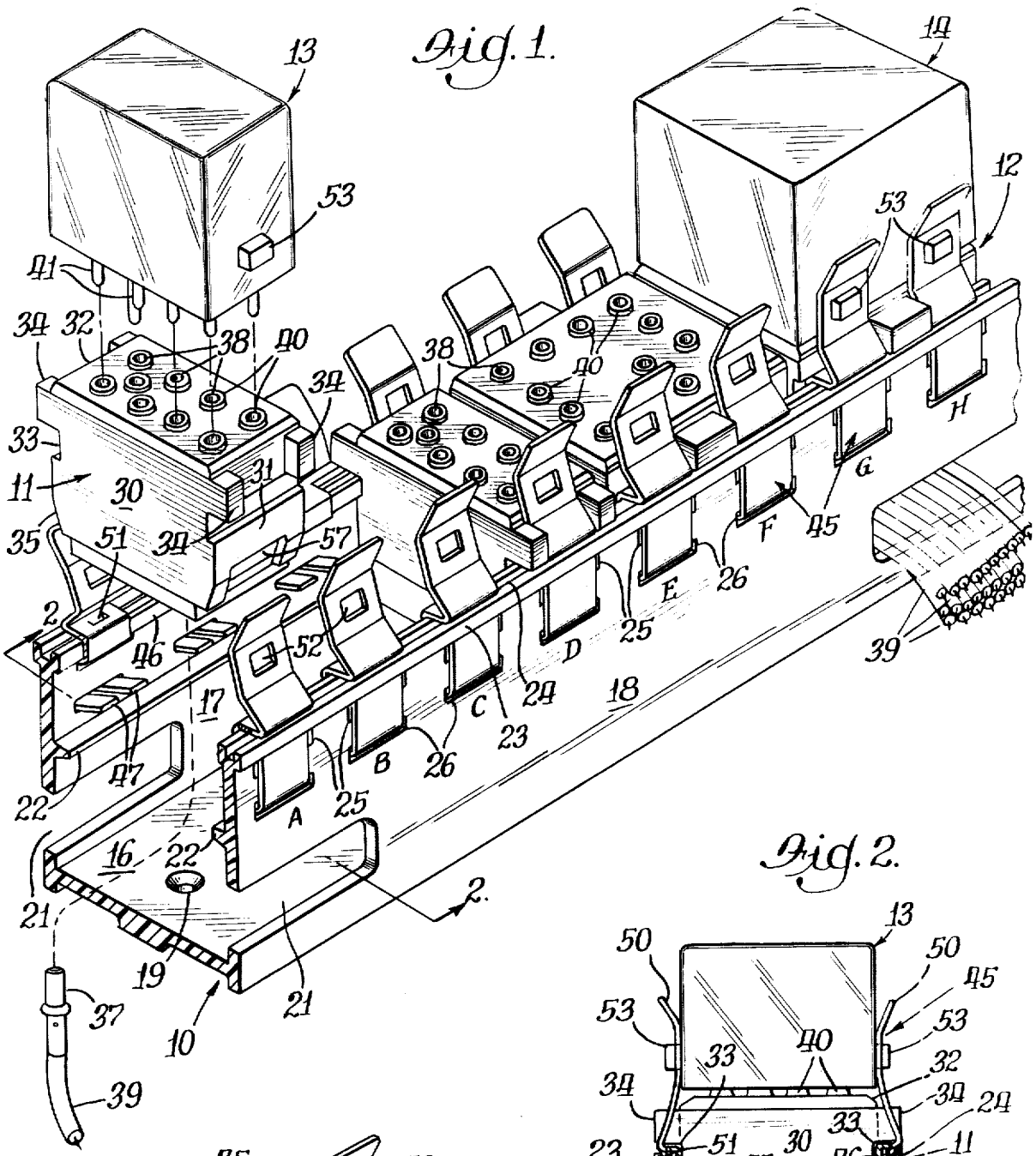
FIG. 1 is an isometric view of an assembly embodying the invention.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

In the disclosed embodiment there is a track, generally 10, which defines a plurality of stations A . . . H, et seq. Single wiring connector units, generally 11, may be mounted at each station or multiple wiring connector units, generally 12, may be used at adjacent stations. A single electrical component or module, generally 13, plugs into the single connector unit 11 or a multiple electrical component or module, generally 14, plugs into the multiple wiring connector 12. These electrical components or modules might be one of a wide variety of forms. It could, for example, house one or more relays, an electrical amplifier, a bussing module (i.e., a particular arrangement of electrical connections between the various prongs of the module), a suppressor for voltage transients, etc., etc. It could be merely a connector plug having wires extending therefrom to some remote electrical device. To facilitate its use, the exterior of the module could well have a description of what is contained therein and/or a wiring diagram of its contents.

The track 10 preferably is an extrusion of aluminum or plastic. The various openings therein would be cut after extrusion. It comprises a base 16 and two upstanding rails 17 and 18. The base has a plurality of openings 19 to receive mounting screws 20. The rails have a series of openings 21 so that wiring to the connector units 11 can be brought out of the assembly as required. Extending longitudinally of the rails are ribs 22 which serve to stiffen the rail. At the distal end of the rail (at the top of the rail web) each rail has an enlargement or head 23. Thereby the adjacent sides of the heads extend closer to each other than do the corresponding sides of the rail web. This provides a pair of locking abutments or lips, one on each rail. The distal ends of the rail heads have grooves 24 extending the lengths thereof. At each station A . . . H are a pair of openings 25 and 26 in the web of each rail.

The wiring connectors 11 comprise a body having sides 30, ends 31 and a face plate 32. The ends 31 have slots 33 extending thereacross from side to side. Above these slots on each of the ends are a pair of spaced projections 34. Below the slots, the ends 31 are approximately the same distance apart as the distance between the webs of the rails 17 and 18. Adjacent the bottom, the ends have inward tapers 35. Within the body are secured a plurality of sockets 37. Each socket is associated with a respective opening 38 in face plate 32 and has a wire 39 which extends outwardly from the body. A gasket 40 of elastomeric material is mounted on face plate 32 about each of openings 38 to serve as a seal. Multiple connectors 12 are substantially the same. The only major difference is that they have a single projection 36 at the end rather than the two projections 34. The electrical components or modules 13, 14 have a plurality of metal plugs or prongs 41 positioned to be received in sockets 37 to make an electrical connection therewith.

At each of the stations A . . . H are a pair of spring metal [chips] *clips*, generally 45. These clips are identical and are formed of a single sheet of metal with integral connectors 46 between each adjacent clip. Each clip includes: a foot 47 which extends through opening 26 in the web of the rail; a leg 48; a hip 49 which is of a "U" configuration so that it extends through opening 25, about the inner face of head 23 of the rail and across most of the top of the head of the rail; and an upper body 50. The hip has a prong 51 cut and bent downwardly therefrom so as to extend into groove 24. The upper body of the clip has an opening 52 which receives a projection 53 on the end of the electrical components 13, 14.

Figure 3:
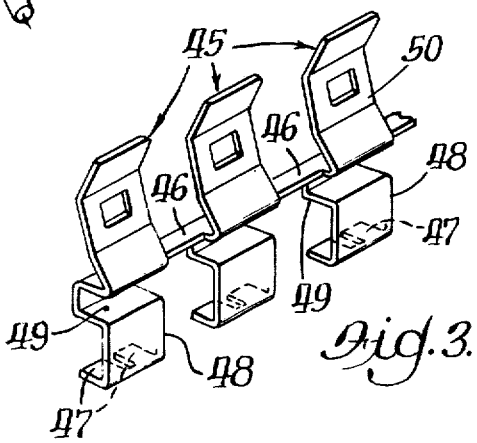
FIG. 3 is an isometric view of a multiple clip component used in the embodiment of FIG. 1.

For a particular installation, a user would initially decide as to the number of stations A . . . H, etc., that would be required. An appropriate length of track 10 would be cut off, as well as an appropriate length of two strips comprising clips 45 and their connectors 46. Each strip of connectors would be mounted on its respective rail as a unit. To do this, the foot 47 is inserted through openings 25 from the inside. This is done with the clip rotated down from its position as illustrated (counterclockwise in FIG. 3). After the foot is passed through opening 25 the clip is rotated toward the erect position so that the foot 47 can be inserted through opening 26 from the outside of the rail. As the clip is rotated to the fully erect position illustrated, the prong 51 drops into groove 24 to lock the clip in that position.

To insert a wiring connector unit 11, 12 into place, the unit is positioned above the rail (as illustrated at the left end of FIG. 1) at the desired station (or stations if it is a multiple unit). It is then moved downwardly into the rail in a position such that the projections 34 are on opposite sides of a clip, or the projection 36 of the multiple units 12 are between adjacent clips. To permit the portions of the wiring connector body which are below slot 33 to move past rail heads 23 and the hips 49 of the clips, the rails are spread apart at the heads thereof. The tapered areas 35 on the connector bodies act as cams to aid in so spreading the distal ends of the rails apart. The inherent resiliency of the rails permits them to be so spread and for the rails to return to the illustrated position after the slots 33 on the connector bodies are aligned with the heads of the rail. At this time the inwardly *extending* protrusions formed by the heads of the rail and the hip of the clips securely locks the wiring connector body onto the rail. Thus, the electrical components 13, 14 may be plugged into and removed from the wiring connector units 11, 12 without fear that the latter will become disengaged from the rail.

Figure 2:
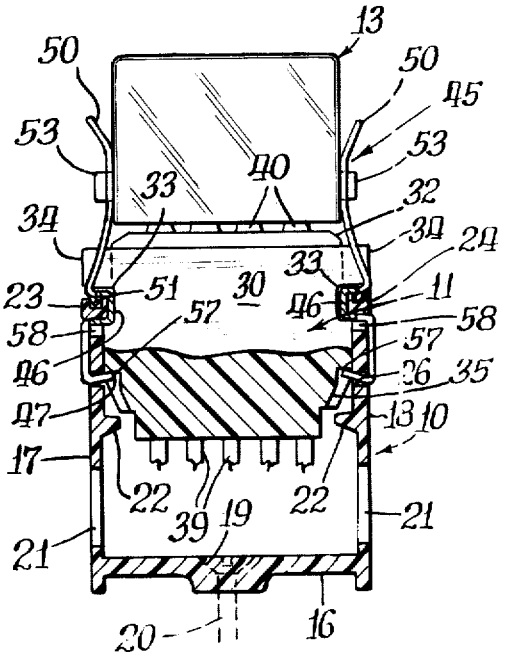
FIG. 2 is a section as viewed at line 2—2 of FIG. 1.

The electrical components 13, 14 are positioned over the particular wiring unit to which they are to be connected. The plugs 41 are inserted into the sockets 37. As the electrical component then is moved into its fully seated position the projections 53 cam the distal ends of the clips outwardly to allow the projections to slip down past the outer end of the clips to their final position opposite openings 52. At this point the clips lock about the projections as seen at the right side of FIG. 1 and in FIG. 2. In this position the clips hold the electrical component onto the wiring connector and the two are locked to the track 10.

An important feature of the invention is that the wiring connector unit and the electrical component are urged together so that the gaskets 40 form an effective seal between the two. Thus in FIG. 2, the upper body portion 50 of each of the clips is securely locked on the respective projection 53 so that the electrical component 13 cannot move upwardly with respect to the clip. At the same time, the distal end or toe of foot 47 is pressing upwardly on an abutment 57 at the end of the wiring unit and applies [and] *an* upward force thereto so as to urge the wiring unit upwardly toward the removable electrical component 13. This force is transmitted between the two units through the seals 40 and hold the seals in compression so that an effective seal is maintained. It will be noted in FIG. 2 that the vertical depth of slots 33 is greater than the corresponding depth of the hips 49 of the clip. Thus the wiring unit 11 has some freedom of vertical movement with respect to the track and clip. When the electrical component 13 is not in place (or at least the clips 45 are disengaged from the projections 53) the spring force of the feet 47, as above described, causes the wiring unit to move up, closing spaces 58. However, when the electrical component 13 is put into place it is necessary, in order to engage the clips 45 with projections 53, that the electrical component and the wiring unit 30 be pushed downwardly opening up spaces 58. As this occurs, a spring force is generated in the feet 47 for the above described purpose. The amount of this spring force can be controlled during manufacture by the size of the space between the two parts of the bifurcated end.

Various modifications will become apparent to those skilled in the art from the above. For example, the wiring connector unit and/or the electrical component or module can occupy a selected number of stations, not necessarily one or two. While the clips 45 are unitary (and advantageously so) it would be possible to use separate spring components for the feet 47 and the upper clip body 50, with the two components being locked together or both locked to a rail. In that event, the ends of the wiring unit 30 could seat against the head 23 of the rail at slots 33 rather than seating against the hip portion 49 of the clips as in the illustrated embodiment.

The space between the bottom of the connector units 11, 12 and the base 16 of the track serves as a raceway for confining and protecting electrical wires, e.g., 39. In the event that a malfunction would develop in a socket, e.g., 37, the respective connector unit 11, 12 can be removed and replaced by reversing the procedure of its installation.

While reference is made to top, bottom, vertically, etc., herein, this is just for convenience of understanding. The various parts can, of course, be oriented in diverse manners with respect to the vertical without changing the structure involved.

I claim:

1. In an electrical apparatus comprising electrical component means, connector means having wires extending therefrom and a mounting track, said track including a pair of parallel rails defining a space therebetween, said connector means being positioned in said space and supported on said rails, said means having a plurality of mating plugs and sockets for releasably securing the component means to the connector means, the improvement comprising:

a plurality of pairs of spring clip means engaging the track, the two clip means of each pair being mounted opposite each other on respective rails and each pair defining a station, said track having the general shape of a U shaped channel having an open side and including a base between said rails opposite said open side, said rails at each station having members for supporting a connector means at said open side and at a specific location above said base whereby the wires may extend through the part of that space between the connector means and the base, said clip means and said component means having interengaging devices for releasably securing the clip means to the component means, said clip means applying a spring force between the track and the component means urging the component means onto the connector means and holding the combination of a component means and a connector means onto the rail.

2. In an apparatus as set forth in claim 1, wherein each rail has a web extending outwardly from said base and a head at the distal end of the web, said head forming a lip extending closer to the other rail than does the web, each connector means having ends in juxtaposition to the rails and sides from end to end, said ends having slots extending from one side to the other for receiving said lips.

3. In an apparatus as set forth in claim 1, including integral connectors between adjacent pairs of clip means.

4. In an electrical apparatus comprising electrical component means, connector means having wires extending therefrom and a mounting track, said track including a pair of parallel rails defining a space therebetween, said connector means being positioned in said space and supported on said rails, said means having a plurality of mating plugs and sockets for releasably securing the component means to the connector means, the improvement comprising:

a plurality of pairs of spring clips, the two clips of each pair being mounted opposite each other on respective rails and each pair defining a station, said track having the general shape of a channel and including a base between said rails, said rails at each station having members for supporting a connector means at a specific location above said base whereby the wires may extend through that space, said clips and said component means having interengaging devices for releasably securing the clips to the component means, whereby the clips hold the component means onto the connector means and the combination of a component means and a connector means onto the rail, each rail having a web extending outwardly from said base and a head at the distal end of the web, said head forming a lip extending closer to the other rail than does the web, each connector means having ends in juxtaposition to the rails and sides from end to end, said ends having slots extending from one side to the other for receiving said lips, as measured normal to said base, said slots being sufficiently wide to permit the connector means limited movement toward and away from said base, said interengaging devices limiting the extent to which said combination of a component means and a connector means may move away from said base, each spring clip including a foot contacting a part of the connector means and urging the connector means away from the base and thus against the component means of the combination.

5. In an apparatus as set forth in claim 4, wherein at each station each rail has two slots through the web substantially parallel to the base, one of said slots being adjacent the head and the other slot being between said one slot and the base, said foot extending through said other slot, said clip having a portion extending from said foot along the outside of the rail between said slots, through said one slot and about said lip.

*6. In an apparatus as set forth in claim 1, including gasket means between said connector means and said component means, said gasket means being of elastomeric material, and being in compression when said clip means is so holding the component means onto the connector means.*

*7. In an apparatus as set forth in claim 6, wherein the gasket means comprises a plurality of individual grommets, each grommet encircling a respective plug.*

* * * * *